United States Patent [19]

Cataldo

[11] Patent Number: 5,055,094
[45] Date of Patent: Oct. 8, 1991

[54] CONTINUOUSLY VARIABLE TRANSMISSION

[75] Inventor: Roy S. Cataldo, Birmingham, Mich.

[73] Assignee: General Motors Corporation, Detroit, Mich.

[21] Appl. No.: 496,842

[22] Filed: Mar. 21, 1990

[51] Int. Cl.$^5$ .................... F16H 9/26; F16H 37/00; F16H 37/06

[52] U.S. Cl. .................... 475/211; 475/207; 475/210

[58] Field of Search ............ 475/210, 211, 212, 219, 475/215, 209, 214

[56] References Cited

U.S. PATENT DOCUMENTS

| | | | |
|---|---|---|---|
| 2,955,477 | 10/1960 | Ryan | 475/210 X |
| 3,106,855 | 10/1963 | Reichenbaecher | 475/210 |
| 3,158,041 | 11/1964 | Rae | 475/215 |
| 3,203,277 | 8/1965 | General | 475/211 X |
| 4,192,200 | 3/1980 | McCoin | 475/215 |
| 4,192,201 | 3/1980 | McCoin | 475/215 |
| 4,402,237 | 9/1983 | Tomlinson | 475/211 X |
| 4,470,326 | 11/1984 | Schmidt | 475/211 |
| 4,589,303 | 5/1986 | Roberts | 475/211 |
| 4,599,916 | 7/1986 | Hirosawa | 475/210 |
| 4,856,371 | 8/1989 | Kemper | 475/215 |
| 4,856,374 | 8/1989 | Kreuzer | 475/216 X |
| 4,864,889 | 9/1989 | Sakakibara et al. | 475/219 X |
| 4,990,127 | 2/1991 | Roberts et al. | 475/212 X |

FOREIGN PATENT DOCUMENTS

| | | |
|---|---|---|
| 3212769 | 10/1983 | Fed. Rep. of Germany ...... 475/210 |
| 3538343 | 5/1986 | Fed. Rep. of Germany ...... 475/211 |
| 3543635 | 6/1986 | Fed. Rep. of Germany ...... 475/211 |

Primary Examiner—Leslie A. Braun
Assistant Examiner—David E. Henn
Attorney, Agent, or Firm—Donald F. Scherer

[57] ABSTRACT

A continuously variable transmission has a continuously variable unit in the form of a variable belt drive and a pair of interconnected planetary gear sets arranged in differential drive relation between the transmission input shaft and the transmission output shaft. One of the planetary gear sets is connected with the input shaft, the output shaft and the output shaft of the belt drive. The other planetary gear set is connected with the input shaft, the output shaft and the input shaft of the belt drive. The overall transmission ratio is controlled between limits established in the continuously variable unit. The ratio is varied within a continuously variable range by varying the belt ratio.

3 Claims, 2 Drawing Sheets

CONTINUOUSLY VARIABLE TRANSMISSION

BACKGROUND OF THE INVENTION

This invention relates to power transmissions, and more particularly, to power transmissions having an infinitely variable speed ratio throughout a range of speed ratios.

More specifically, this invention relates to the combination of a variable ratio belt drive mechanism and a planetary gear arrangement connected in drive relation between an input and an output shaft of a transmission.

SUMMARY OF THE INVENTION

The present invention incorporates a differential gearing and a variable ratio belt drive mechanism to provide a bifurcated or three path double differential continuously variable transmission with the forward, reverse and neutral operating conditions without using selectively engageable friction clutches or brakes.

The continuously variable transmission has a maximum forward speed ratio when the variable belt drive mechanism is controlled at its maximum speed ratio, and a maximum torque ratio when the variable belt drive mechanism is at a very low speed ratio and the transmission has a substantially zero or neutral drive condition. When the variable belt drive mechanism speed ratio is extended to less than the neutral condition, a reverse drive occurs through the transmission.

By adjusting the speed ratio up or down from zero continuously variable transmission geared neutral condition, the transmission is operated in forward and reverse ratios, respectively. The geared neutral condition of the transmission is preferably established at approximately the 0.58 ratio in the belt drive mechanism to provide a wide forward speed ratio coverage (i.e., 0 to 2.4) and a narrow reverse speed ratio coverage (i.e., 0 to 1.7). Maximum forward and reverse torque ratios occur in the transmission adjacent the neutral condition.

The differential gearing is comprised of two interconnected planetary gear sets, each of which has a member driven by the continuously variable transmission input and a member driving the continuously variable transmission output. One of the planetaries has a member connected to provide an input drive to the variable belt drive mechanism and the other planetary has a member connected to be driven by the output of the variable belt drive mechanism.

It is a primary object of this invention to provide an improved continuously variable transmission, wherein a differential gear mechanism and a variable ratio belt drive mechanism are combined to provide a forward drive range, a reverse drive range and a geared neutral condition without the use of friction drive devices, such as clutches and brakes.

It is another object of this invention to provide an improved continuously variable power transmission having an input shaft and an output shaft drivingly connected to members of a differential mechanism comprised of a pair of interconnected planetary gear sets which have members also connected to the input and output components of a variable ratio belt drive unit, wherein the overall ratio of the transmission is controlled by the ratio established in the variable ratio belt drive unit.

It is a further object of this invention to provide an improved continuously variable transmission having a variable belt drive ratio unit including a belt drive and a pair of planetary gear assemblies, wherein one planetary gear assembly has a first sun gear drivingly connected with a transmission input, a second sun gear drivingly connected with a transmission output, and a carrier drivingly connected with one member of the belt drive, and wherein the other planetary gear assembly has a ring gear drivingly connected with the transmission input, a sun gear drivingly connected with the transmission output and a carrier connected with another member of the belt drive, and further wherein the belt drive provides a unidirectional variable speed range between the planetary members resulting in a reverse speed range, a geared neutral condition and a forward speed range between the transmission input and output shafts.

These and other objects and advantages of the present invention will be more readily apparent from the following description and drawings.

DESCRIPTION OF THE EXEMPLARY EMBODIMENT

Figure 1:
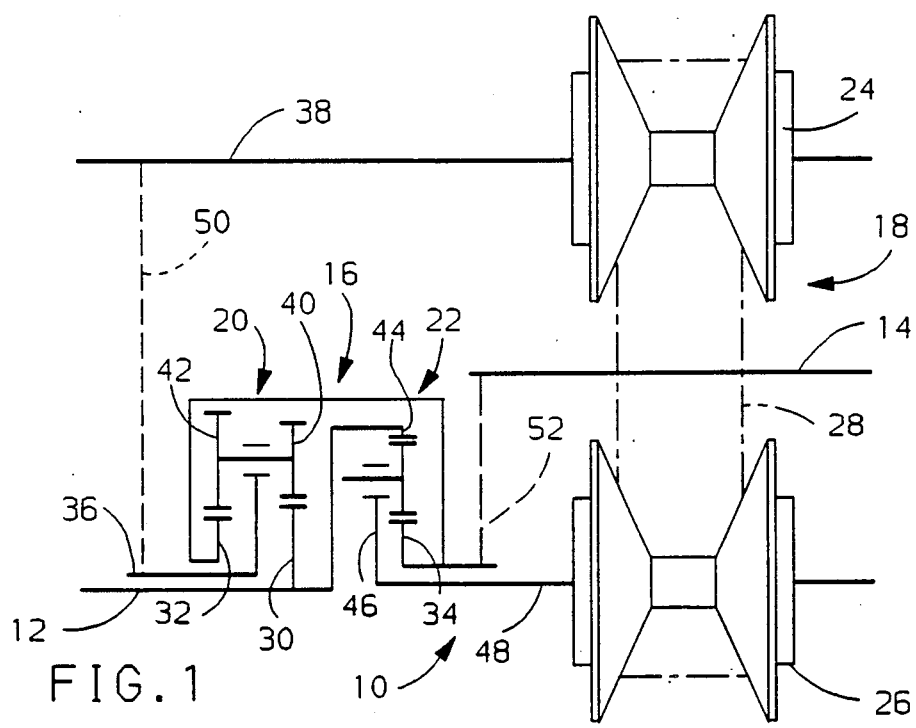
FIG. 1 is a schematic representation of a transmission incorporating the present invention.

Referring to the drawings, wherein like characters represent the same or corresponding parts throughout the several views, there is seen in FIG. 1 a continuously variable transmission arrangement generally designated 10, which is comprised of an input shaft 12, an output shaft 14, a planetary differential gear mechanism 16 and a continuously variable belt drive unit 18.

Figure 2:
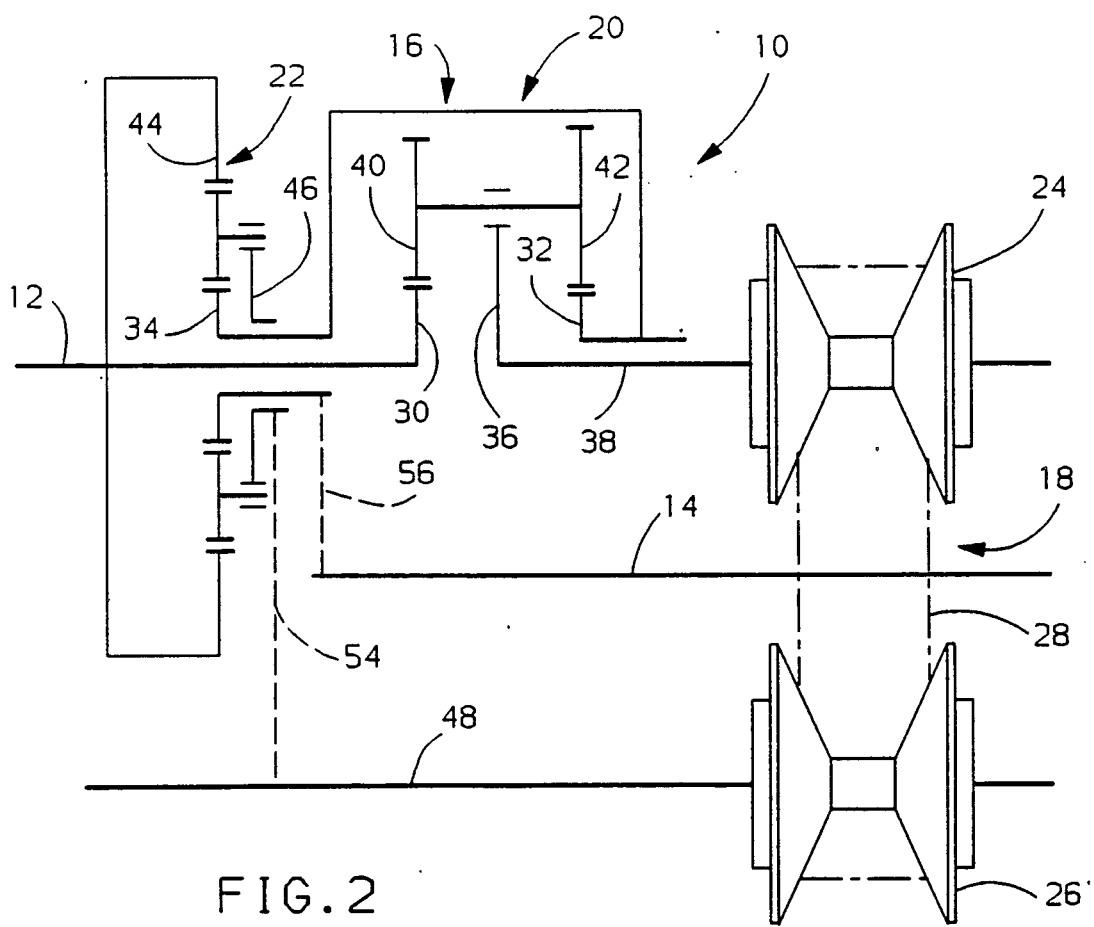
FIG. 2 is a schematic representation of another transmission incorporating the present invention.

A continuously variable transmission 10', shown in FIG. 2, also has an input shaft 12, an output shaft 14, a planetary differential gear arrangement 16 and a continuously variable belt drive unit 18. The differential planetary gear unit 16 includes a pair of planetary gear sets 20 and 22. The continuously variable belt drive unit 18 includes an input pulley 24, and output pulley 26 and interconnecting belt member 28.

The continuously variable belt drive unit 18 can be constructed in accordance with any of the well-known movable sheave belt drive units that are commonly available. As is well known, these units will provide, within a predetermined range, a continuously variable speed ratio between the input and output pulleys of the belt drive unit depending upon the distance between the sheave members of the respective input pulley 24 and output pulley 26. The positioning of the movable sheaves can be controlled either hydraulically or mechanically and there are many well known structures to accomplish this sheave positioning control.

The planetary gear set 20 includes a sun gear 30 drivingly connected with the input shaft 12, a sun gear 32 drivingly connected with a sun gear 34 of the planetary gear set 22 and a carrier member 36 which is drivingly connected with an input shaft 38 of the continuously variable unit 18. The input shaft 38 is drivingly connected with the input pulley 24. The carrier 36 has rotatably mounted thereon a pair of interconnected pinion gears 40 and 42 which mesh with the sun gears 30 and 32 thereby communicating rotational forces between the sun gears 30 and 32.

The planetary gear set 22 includes the sun gear 34, a ring gear 44 drivingly connected with the input shaft 12, a carrier 46 drivingly connected with an output shaft 48 which in turn is drivingly connected with the pulley 26 of the continuously variable belt drive unit 18. The sun gears 32 and 34 are connected with the output shaft 14 of the continuously variable transmissions 10 and 10'. The drive connection between carrier 36 and input shaft 38 in FIG. 1 is accomplished by a fixed ratio chain drive 50. Also in the transmission 10 shown in FIG. 1, the drive connection between the sun gears 32 and 34 and the output shaft 14 is provided by a fixed ratio chain drive 52. The transmission 10' shown in FIG. 2 has the carrier 46 drivingly connected with the shaft 48 through a fixed ratio chain drive 54, while the transmission output shaft 14 is drivingly connected to the sun gears 32 and 34 by a fixed ratio chain drive 56. In the preferred embodiment, the ratio of each of the chain drives is 1:1.

The differential gear arrangement 16 of FIG. 1 is rotatably mounted coaxial with the transmission input shaft 12 and the continuously variable belt drive unit output shaft 48. In other words, the gear cluster represented by the differential gear arrangement 16 is disposed on the output shaft of the continuously variable belt drive unit. The gear cluster represented by the differential gear unit 16 shown in FIG. 2 is rotatably mounted coaxial with the axis of the input shaft 38 of the continuously variable belt drive unit 18 and the transmission input shaft 12. The primary difference between the transmission shown in FIGS. 1 and 2 is the packaging arrangement and the disposition of the differential gear unit 16.

During operation of the transmissions shown in FIGS. 1 and 2, the drive ratio between the pulleys 24 and 26 is controlled throughout a continuously variable speed range to effect a continuously variable speed range for the transmission 10 and 10'. There is a predetermined speed ratio at which the continuously variable belt drive unit 18 can be operated which will result in a zero output speed at the transmission output shaft 14 while the transmission input shaft 12 is being rotated. This can be seen on the curve shown in FIG. 2 in which the continuously variable transmission speed ratio is zero while the continuously variable unit ratio is set at approximately 0.579. As the continuously variable unit speed ratio is increased above the ratio 0.579 to approximately a ratio of 2.4, a continuously variable transmission ratio will also increase in a forward or positive direction. As the continuously variable unit speed ratio is decreased below the value 0.579, the continuously variable transmission speed ratio will increase in a reverse or negative direction. Therefore, it is apparent that a geared neutral condition is available in the present transmission.

Figure 3:
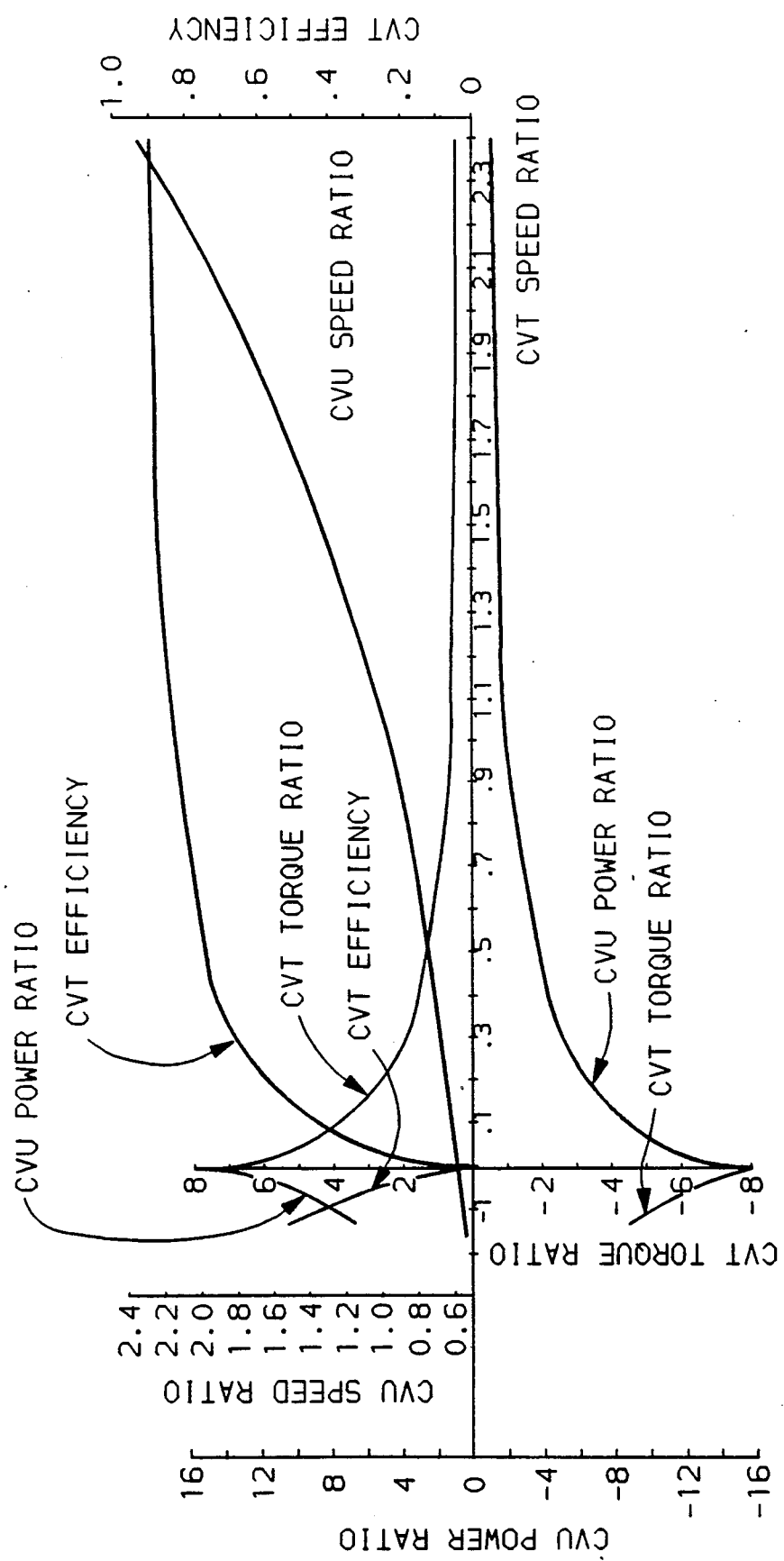
FIG. 3 is a plurality of curves representing the typical operating performance of the transmissions shown in FIGS. 1 and 2.

In a geared neutral condition, the transmission input shaft is continuously rotated while the transmission output shaft remains stationary without the use of selectively engageable friction devices to control the planetary gear ratios. It should also be noted in the curves of FIG. 3 that the magnitude of torque ratio within the continuously variable transmission decreases as the speed ratio in the continuously variable belt drive unit 18 is adjusted away from the 0.579 value. The value at which the geared neutral condition occurs is determined by the value of the number of teeth on each of the gear elements within the differential gear unit 16.

With the following gear ratios provided in the planetary gear sets 20 and 22, the geared neutral ratio occur at a speed ratio of 0.579 in the continuously variable belt drive unit 18. The ratio of ring gear 44 to sun gear 34 is −4.2 and the ratio of sun gear 30 to sun gear 32 is 3.186. The ratio between the sun gears 30 and 32 is, of course, affected by the number of teeth on the pinions 40 and 42, as well as the sun gears 30 and 32. This geared neutral condition can, of course, be changed by changing the gear ratios within the planetary gear sets.

The embodiments of the invention in which an exclusive property or privilege is claimed are defined as follows:

1. A continuously variable transmission comprising: input shaft means; output shaft means; first planetary gear means having a first member continuously driven by said input shaft means, a second member continuously drivingly connected to said output shaft means, a third member having a first gearing means drivingly interconnecting the members; second planetary gear means having a first member continuously drivingly connected with said input shaft means, a second member continuously drivingly connected with said output shaft means, a third member having a second gearing means for drivingly interconnecting the members; and continuously variable drive means having input means continuously drivingly connected with said third member of said first planetary gear means, output means continuously drivingly connected to said third member of said second planetary gear means and continuously variable ratio means drivingly connected between said input means of said continuously variable drive and said output means of said continuously variable drive means and being operable through a range of ratios to provide a reverse range, a neutral condition and a forward range of drive ratios from said input shaft means and said output shaft means.

2. A continuously variable transmission comprising: input shaft means; output shaft means; first planetary gear means having a ring gear continuously driven by said input shaft means, a sun gear continuously drivingly connected to said output shaft means and a planet carrier having pinion gears mounted thereon in meshing relationship with the sun gear and the ring gear; second planetary gear means having a first sun gear continuously drivingly connected with said input shaft means, a second sun gear continuously drivingly connected with said output shaft means and a carrier means having interconnected pinion gear means meshing with respective ones of the first and second sun gears; and continuously variable driven means having input means continuously drivingly connected with said planet carrier of said first planetary gear means, output means continuously drivingly connected to said carrier means of said second planetary gear means and continuously variable ratio belt means drivingly connected between said input means of said continuously variable drive means and said output means and being operable through a range of ratios to provide a reverse range, a neutral condition and a forward range of drive ratios from said input shaft means and said output shaft means.

3. A continuously variable transmission comprising: input shaft means; output shaft means; first fixed ratio chain drive means drivingly connected with said output shaft means; second fixed ratio chain drive means; first planetary gear means having a first member continuously driven by said input shaft means, a second member continuously drivingly connected to said first fixed ratio chain drive means, a third member drivingly connected with said second fixed ratio chain drive means and having a first gearing means for drivingly interconnecting the first, second and third members; second planetary gear means having a first member continuously drivingly connected with said input shaft means, a second member continuously drivingly connected with said first fixed ratio chain drive means, a third member and having a second gearing means for drivingly interconnecting the first, second and third members; and continuously variable drive means having input means continuously drivingly connected with said second fixed ratio chain drive means, output means continuously drivingly connected to said third member of said second planetary gear means and continuously variable ratio belt means drivingly connected between said continuously variable drive input means and said continuously variable drive output means and being operable through a range of ratios to provide a reverse range, a neutral condition and a forward range of drive ratios from said input shaft means and said output shaft means.

* * * * *